United States Patent
Dougase et al.

(10) Patent No.: US 10,739,915 B2
(45) Date of Patent: Aug. 11, 2020

(54) PATTERN-PRINTED SHEET AND MANUFACTURING METHOD THEREFOR

(75) Inventors: Tomomichi Dougase, Saitama (JP); Osamu Gotou, Saitama (JP); Yuuichi Isemori, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 14/347,694

(22) PCT Filed: Feb. 15, 2012

(86) PCT No.: PCT/JP2012/053581
§ 371 (c)(1),
(2), (4) Date: May 29, 2014

(87) PCT Pub. No.: WO2013/046743
PCT Pub. Date: Apr. 4, 2013

(65) Prior Publication Data
US 2014/0315003 A1  Oct. 23, 2014

(30) Foreign Application Priority Data
Sep. 28, 2011  (JP) ................................. 2011-212665

(51) Int. Cl.
*G06F 3/042* (2006.01)
*B41M 1/10* (2006.01)
*B43L 1/00* (2006.01)

(52) U.S. Cl.
CPC .............. *G06F 3/042* (2013.01); *B41M 1/10* (2013.01); *B43L 1/00* (2013.01); *B43L 1/002* (2013.01);
(Continued)

(58) Field of Classification Search
None
See application file for complete search history.

(56) References Cited

U.S. PATENT DOCUMENTS

| | | | |
|---|---|---|---|
| 6,962,450 B2 * | 11/2005 | Brouhon | G06F 3/0321 178/18.01 |
| 2003/0051637 A1 * | 3/2003 | Klass | D21B 19/40 106/483 |

(Continued)

FOREIGN PATENT DOCUMENTS

| | | |
|---|---|---|
| JP | 2-29772 U | 2/1990 |
| JP | 2002-200835 A | 7/2002 |

(Continued)

OTHER PUBLICATIONS

JP 2010-085532A, Yuichi et al., Machine Translation via AIPN website.*

*Primary Examiner* — Laura C Powers
(74) *Attorney, Agent, or Firm* — Locke Lord LLP

(57) ABSTRACT

Provided by the present inventions are a pattern-printed sheet and a method for manufacturing this, wherein the pattern-printed sheet is characterized that on a precoat layer laminated on a substrate are formed an optically readable region in which a dot pattern optically readable by an input terminal is printed and an optically unreadable region in which a dot pattern optically unreadable by an input terminal is printed, and the dot pattern formed in the optically unreadable region is a halftone tint having regularity whose halftone dot concentration is in the range of 10 to 30%. This pattern-printed sheet not only can be obtained by using a gravure printing method having outstanding production efficiency but also has a dot pattern readable with high reading precision in a prescribed dot size.

13 Claims, 2 Drawing Sheets

(52) U.S. Cl.
CPC .................. *Y10T 428/24802* (2015.01); *Y10T 428/24851* (2015.01); *Y10T 428/24893* (2015.01); *Y10T 428/24901* (2015.01)

(56) References Cited

U.S. PATENT DOCUMENTS

| | | | | |
|---|---|---|---|---|
| 2003/0108730 A1* | 6/2003 | Francis | ................ | B32B 27/08 428/212 |
| 2004/0031409 A1* | 2/2004 | Hirano | ................ | B41C 1/1016 101/463.1 |
| 2005/0255291 A1* | 11/2005 | Iwata | ................ | C08J 7/04 428/141 |
| 2009/0096122 A1* | 4/2009 | Suga | ................ | B29C 45/1418 264/101 |
| 2010/0186897 A1* | 7/2010 | Barker | ................ | C08G 18/10 156/331.7 |
| 2011/0244186 A1* | 10/2011 | Dou | ................ | B29C 47/0021 428/156 |
| 2012/0050816 A1* | 3/2012 | Plante | ................ | H04N 1/32235 358/3.06 |

FOREIGN PATENT DOCUMENTS

| | | | |
|---|---|---|---|
| JP | 2003-256122 A | | 9/2003 |
| JP | 2008-26958 A | | 2/2008 |
| JP | 2008-173859 A | | 7/2008 |
| JP | 2010085532 A | * | 4/2010 |
| JP | 2011-95706 A | | 5/2011 |
| WO | 02/082366 A1 | | 10/2002 |

* cited by examiner

PATTERN-PRINTED SHEET AND MANUFACTURING METHOD THEREFOR

TECHNICAL FIELD

Present invention relates to a pattern-printed sheet and a manufacturing method for it, wherein the pattern-printed sheet is used in a device to which a hand-written information enters thereby transforming a hand-written figure to a digital information, and is used by adhering thereof onto surface of a medium to be written.

BACKGROUND ART

In recent years, a need to transform a hand-written word, figure, symbol, and so forth to electronic data that can be dealt by an information-processing device is increasing; especially a demand on a method with which a hand-written information is entered into a computer and the like in real-time without going through a reading device such as a scanner is increasing.

For example, a transparent sheet arranged in front of a display device, especially, a transparent sheet printed with a dot pattern which is capable of providing location information to show the location of an input trajectory by an electronic input pen and so forth, is disclosed (see, for example, Patent Document 1). This transparent sheet has the dot pattern printed by using an ink emitting the light that can be read by irradiating a light having a prescribed wavelength thereby having a function to provide location information by an input trajectory reading means. However, in Patent Document 1, there is no description as to a kind of the ink that can realize the transparent sheet like this, a direction of the printed surface, a way how to lay out the location information, or the like, so that there is no description as to the specific example of the transparent sheet; and thus, the description thereof is merely an idea or a desire of the transparent sheet.

On the other hand, a proposal was made about a transparent sheet printed with an infrared reflective pattern that can provide an information with regard to location of an input terminal on the transparent sheet, wherein the transparent sheet has a printed surface having a transparent pattern with an infrared light reflective regularity printed on surface of a transparent substrate, and this is installed in front of a display device capable of image-displaying such that the said printed surface may face to the device; the ink to constitute the transparent pattern contains an infrared-reflective material; and the transparent pattern is irradiated with an infrared light from the backside of the printed surface by using an input terminal capable of irradiation and detection of the infrared light thereby reading the reflection pattern of the infrared light (see, for example, Patent Document 2).

In addition, an electronic pen-writing paper is proposed, wherein the electronic pen-writing paper is used for a data-input system to transmit a dot pattern from a transmitting unit to an outside communication device, the said dot pattern printed around the place where an electronic pen is put on being read by a sensing unit that is built-in the electronic pen when an information is written on an information-writing surface by the electronic pen; and if a figure pattern other than the dot pattern is printed on the information-writing surface is printed, the dot pattern is printed firstly, and on it is printed the figure pattern (see, for example, Patent Document 3).

Further, a printed sheet is proposed, wherein the printed sheet is a laminate having a substrate, a regular pattern-printed layer, a primer layer, and a surface protective layer in this order; an ink to constitute the printed layer contains a colorant; the printed layer can provide an information with regard to location of an input terminal on the printed sheet by reading the pattern from the side of the surface protective layer by using a pattern-detectable input terminal; the surface protective layer is a hardened filler-containing curable resin composition; and the 60° gloss value is in the range of 8 to 20 (see, for example, Patent Document 4).

The infrared reflective pattern-printed transparent sheet disclosed in Patent Document 2 is used by installing in front of a display; and the electronic pen-writing paper disclosed in Patent Document 3 is used as an input pad.

During the time of a lecture, a conference, and so forth, in order to make them interactive, it may be sometimes necessary to project a hand-written word, figure, symbol, and the like on a projection screen through a projector or the like after these informations are transformed to electronic data. In addition, it would be very useful if it is possible to project a document, which is directly written in the projected figure on a projection screen, through a projector after it is taken-in in real-time as digital information.

On the other hand, in the case that it is not necessary to make the conference interactive such as those mentioned above, for example, in the case of brainstorming, the projection screen may be used effectively as a writing board like a white board.

The equipment having many functions aggregated as a projection screen and a white board as mentioned above is very useful not only because various uses may be covered by single equipment but also because a space in a conference room may be conserved.

However, practically it is not an easy task to simultaneously satisfy the functions as a projection screen and a white board without impairing the functions as a printed sheet.

Accordingly, the projection screen using the printed sheet disclosed in Patent Document 4 was revolutionary because it had the function as a white board simultaneously.

In the case when a dot pattern is printed on a substrate of the print sheet, a gravure printing method is desirable because of fast printing speed and high productivity; but it has been difficult to obtain a dot pattern readable with high reading precision in a prescribed dot size (dot diameter in the range of 80 to 130 μm) by means of a gravure printing method.

In addition, in the case of the gravure printing method, when a dot pattern is formed by printing in the prescribed area, because a doctor is used, there is a phenomenon that an ink to print the dots spreads out to the printing direction toward the area where the dot pattern is not formed in the boundary of the posterior edge of the dot pattern-formed area in the boundary between the dot pattern-formed area and the dot pattern-unformed area, thereby causing a problem of unstable reproducibility in printing of the pattern edge. As the reason for this, it is presumed that during the time of scraping off the excess printing ink filled in the cell to form the dot pattern by the doctor blade, the doctor bounces in the boundary with the dot pattern-unformed area so that the printing ink cannot be scraped off sufficiently in the posterior edge in the printing direction.

On the other hand, printing of the dot pattern by a digital printing method such as an ink jet printing method is prone to give a more precise dot size as compared with the gravure printing method; however, the practicality thereof has been low because of slow printing speed and poor productivity.

Patent Document 1: Japanese Patent Laid-Open Publication No. 2003-256122
Patent Document 2: Japanese Patent Laid-Open Publication No. 2008-26958
Patent Document 3: Japanese Patent Laid-Open Publication No. 2008-173859
Patent Document 4: Japanese Patent Laid-Open Publication No. 2011-95706

SUMMARY OF THE INVENTION

Problems to be Solved by the Invention

In view of the problems mentioned above, an object of the present invention is to provide a pattern-printed sheet and a manufacturing method for it, wherein the said pattern-printed sheet not only can be obtained by using a gravure printing method having outstanding production efficiency but also has a dot pattern readable with high reading precision in a prescribed dot size.

Means for Solving the Problems

Accordingly, inventors of the present invention carried out an extensive investigation to solve the problems mentioned above; and as a result, it was found that the problems mentioned above could be solved by forming on a substrate an optically readable region and an optically unreadable region; and based on this finding, the present invention could be completed.

That is, the present invention provides:
1. a pattern-printed sheet, wherein on a precoat layer laminated on a substrate are formed: an optically readable region in which a dot pattern optically readable by an input terminal is printed and an optically unreadable region in which a dot pattern optically unreadable by an input terminal is printed; and the dot pattern formed in the optically unreadable region is a halftone tint having regularity whose halftone dot concentration is in the range of 10 to 30%, and
2. a method for manufacturing a pattern-printed sheet, wherein the method is to manufacture a pattern-printed sheet having an optically readable region, in which a dot pattern readable by an input terminal is printed, formed on a substrate, and the method comprises: a step of forming on the substrate a precoat layer comprising a resin composition comprising titanium oxide and at least one resin selected from a polyurethane resin and an acryl polyol resin; a step of forming on the precoat layer a dot-printed layer by gravure printing which uses a printing plate having, on surface of the same gravure printing cylinder, an optically readable region-forming part in which a dot pattern optically readable by an input terminal is engraved, and between the said optically readable region-forming parts, an optically unreadable region-forming part in which a dot pattern optically unreadable by an input terminal is engraved, wherein the dot-printed layer comprises an optically readable region in which a dot pattern readable by an input terminal is printed, and between the said optically readable regions, an optically unreadable region in which a dot pattern unreadable by an input terminal is printed; a step of forming on the dot-printed layer a primer layer; a step of forming on the primer layer a unhardened surface protective layer by applying a curable resin composition; and a step of crosslink-hardening the curable resin composition in the unhardened surface protective layer.

The printed sheet of the present invention can be obtained by using a gravure printing method having outstanding production efficiency; and in addition, it has a dot pattern readable with high reading precision in a prescribed dot size (dot diameter in the range of 80 to 130 μm) whereby providing a precise location information. Moreover, an optically readable region in which a dot pattern optically readable by an input terminal is printed and an optically unreadable region in which a dot pattern optically unreadable by an input terminal are formed on a substrate, especially on a precoat layer which is laminated on a substrate, so that it becomes possible to avoid a phenomenon that an ink to print the dots spreads out to the printing direction in the boundary of the posterior edge of the optically readable region in the boundary between the optically readable region and optically unreadable region, thereby enhancing reproducibility in printing of the dot pattern edge. In addition, the printed sheet of the present invention may be suitably used as a projection screen, a white board, and the like.

In this pattern-printed sheet, configuration is made such that printing may be done by gravure printing which uses a printing plate having, on surface of the same gravure printing cylinder, an optically readable region-forming part in which a dot pattern optically readable by an input terminal is engraved, and between the said optically readable region-forming parts, an optically unreadable region-forming part in which a dot pattern optically unreadable by an input terminal is engraved; and thus, an ink to print the dots does not spread out to the printing direction in the boundary of the posterior edge of the optically readable region in the boundary between the optically readable region and optically unreadable region formed on the substrate by printing, thereby providing a manufacturing method having outstanding reproducibility in printing of the dot pattern edge.

MODES FOR CARRYING OUT THE INVENTION

Figure 1:
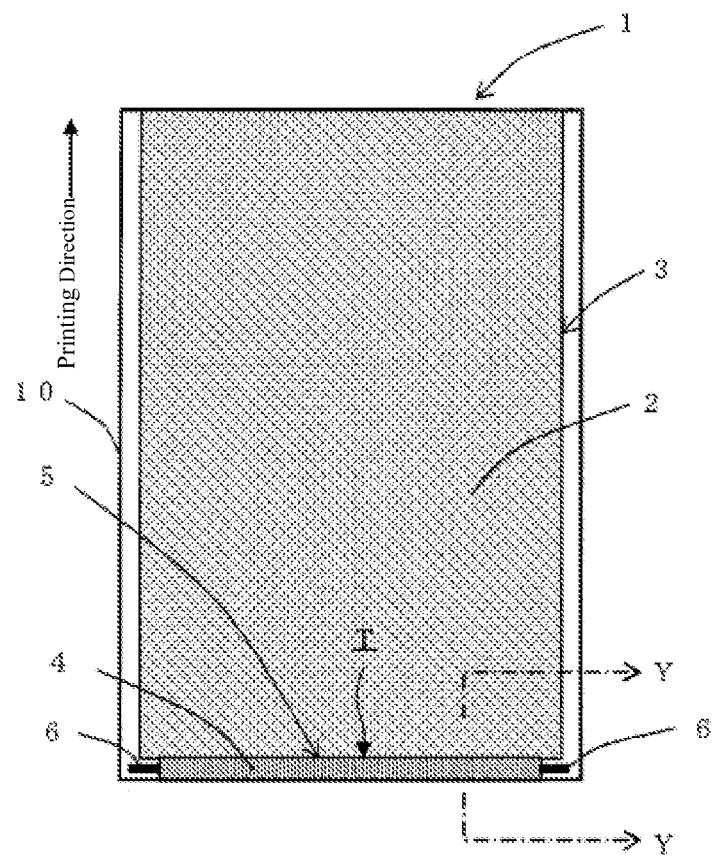
FIG. 1
This is a plane view showing one embodiment of the pattern-printed sheet of the present invention.
Figure 2:
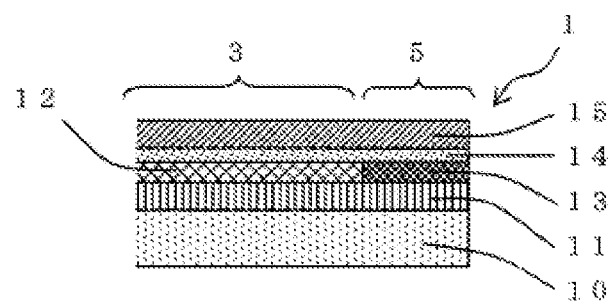
FIG. 2
This is a cross section showing one embodiment of the pattern-printed sheet of the present invention, and is a Y-Y cross section view of FIG. 2.
Figure 3:
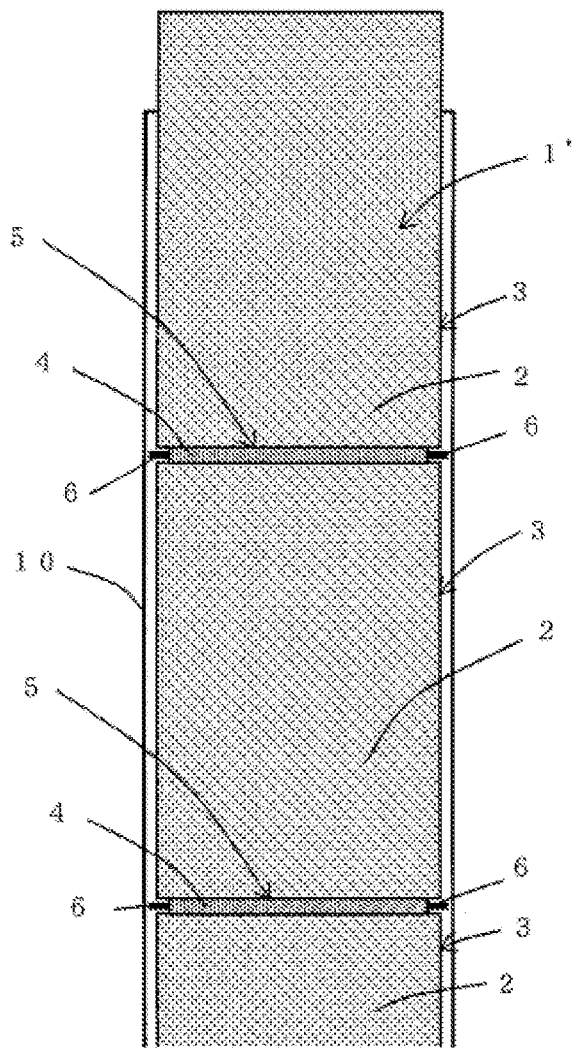
FIG. 3
This shows another embodiment of the pattern-printed sheet of the present invention, and is a plane view of the pattern-printed sheet in the rolled state.
Figure 4:
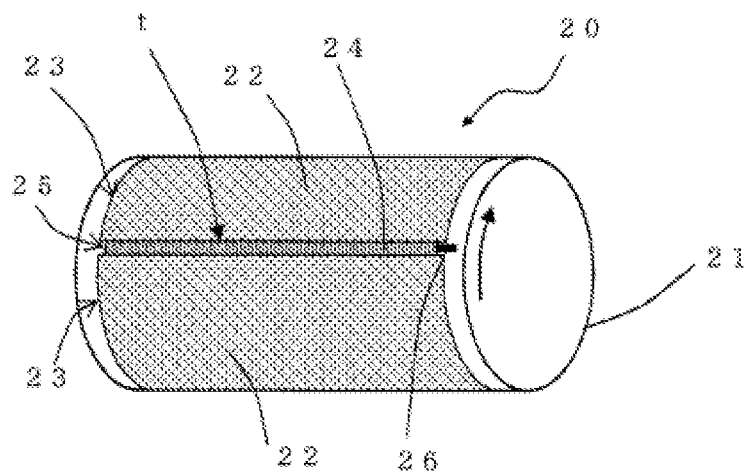
FIG. 4
This is a diagrammatic perspective view showing an outer appearance of the printing plate, which is used to produce the pattern-printed sheet of the present invention, having the optically readable region-forming part and the optically unreadable region-forming part formed on surface of the gravure printing cylinder in the circumferential direction.

The present invention mentioned above will be explained by using drawings and so forth.
FIG. 1 is a plane view showing one embodiment of the pattern-printed sheet of the present invention. FIG. 2 is a cross section showing one embodiment of the pattern-printed sheet of the present invention, and is a Y-Y cross section view of FIG. 1. FIG. 3 shows another embodiment of the pattern-printed sheet of the present invention, and is a plane view of the pattern-printed sheet in the rolled state. FIG. 4 is a diagrammatic perspective view showing the outer appearance of the printing plate, which is used to produce the pattern-printed sheet of the present invention, having the optically readable region-forming part and the optically unreadable region-forming part formed on surface of the gravure printing cylinder in the circumferential direction.

In these drawings, 1 and 1' show the pattern-printed sheets; 2 shows the optically readable dot pattern; 3 shows the optically readable region; 4 shows the optically unreadable dot pattern; 5 shows the optically unreadable region; 6 shows the phototube mark; 10 shows the substrate; 11 shows the precoat layer; 12 and 13 show the dot-printed layers; 14 shows the primer layer; 15 shows the surface protective layer; 20 shows the printing plate; 21 shows the gravure printing cylinder; 22 shows the engraved optically readable dot pattern; 23 shows the optically readable region-forming part; 24 shows the engraved optically unreadable dot pattern-forming part; 25 shows the optically unreadable region-forming part; 26 shows the phototube mark-forming part; T shows the posterior edge of the optically readable region; and t shows the posterior edge of the optically readable region-forming part.

FIG. 1 is a plane view showing one embodiment of the pattern-printed sheet of the present invention. As shown in FIG. 1, the pattern-printed sheet 1 of the present invention is formed of, on the precoat layer 11 laminated on the substrate 10, the optically readable region 3 which is printed with the dot pattern 2 that is optically readable by an input terminal and the optically unreadable region 5 which is printed with the dot pattern 4 that is optically unreadable by an input terminal. Numeral 6 in the drawing shows the phototube mark, which is formed in a step of printing the optically readable dot pattern 2 and the optically unreadable dot pattern 4, and is necessary when the pattern-printed sheet in the rolled state is cut into sheets in the later step. FIG. 1 shows the pattern-printed sheet 1 which is changed to the state of a sheet.

The optically readable dot pattern 2 formed in the optically readable region 3 is configured by, for example, many independent dots, which are dispersively laid out on the substrate 10. The size of the dots to constitute the optically readable dot pattern 2 is preferably in the range of 80 to 130 μm in its diameter; and the dot density thereof is preferably in the range of 5 to 20 dots/mm². These dots are laid out in accordance with a prescribed regularity so as to be optically readable; and location thereof on the pattern-printed sheet can be identified from the lay-out relation. The dot pattern like this is specifically exemplified by a so-called Anoto pattern specified by Anoto Group AB. The dot pattern having a regularity in the present invention may be exemplified by such as, for example: plural dot forms are determined, and whereby the dots having these plural forms laid out within a prescribed area in a plane are combined to form a pattern, as shown in Patent Document 1; widths of the lines laid out in matrix are changed, and whereby the sizes of the overlapping parts of the lines within a prescribed area are combined to form a pattern; the values in the x- and y-axes are directly combined with the horizontal and vertical sizes of the dot; and especially simple and preferable one is a method wherein reference points are set up in parallel in vertical and horizontal directions with the same distance, and the dots that are displaced from side to side and up and down from these reference points are arranged, thereby utilizing the relative location relation from the reference points of these dots. Further, the dot pattern such as the one disclosed in Japanese Patent Laid-Open Publication No. 2008-252914 may be mentioned, in which as the dot pattern, information dots are laid out so as to be displaced by a prescribed distance, on virtual lattice lines arranged in the x and y directions respectively with prescribed distances, to the x-axis or to the y-axis from the lattice point in the original location of a usual halftone printing.

There is no particular restriction as to the dot form in the dot pattern provided that it is readily distinguishable from that of the neighboring dot; and the form thereof is usually circular, oval, polyhedral, star-like, or the like in the plane view. There is no particular restriction as to the dot's steric figure, either; and a rough disk-like figure, a semi-spherical figure, a concave figure, a polyhedral figure, and the like may be exemplified for it. Among them, a circular form in the plane view is preferable.

The optically unreadable dot pattern 4 formed in the optically unreadable region 5 is configured by, for example, many independent dots, and is laid out with regularity on the substrate 1. The optically unreadable dot pattern 4 is formed such that the halftone dot concentration in the halftone tint having regularity may be in the range of 10 to 30%; and these dots are arranged in order, while location thereof cannot be identified on the pattern-printed sheet. If the halftone tint concentration is less than 10%, there is a risk that the doctor may bounce in the posterior edge in the printing direction of the optically readable region-forming part in the printing plate during gravure printing so that there is a chance to cause poor printing such as spreading-out of the ink. On the other hand, if the halftone tint concentration is more than 30%, use amount of the ink increases thereby leading to higher cost. Meanwhile, the halftone tint means a pattern in that halftone dots are laid out with a certain ratio and with uniform concentration. Number of the lines of the halftone tint is not particularly restricted; however, 200 lines per one inch are usually used.

There is no particular restriction as to the dot form in the dot pattern; and the form thereof is usually circular, oval, polyhedral, star-like, or the like in the plane view.

The optically readable region 3 and the optically unreadable region 5 may be formed contiguously or with a small space therebetween. If the space is 2 mm or less, the ink to print the dots does not spread out in the posterior edge T of the optically readable region 3 to the printing direction of the optically readable region 3 and the optically unreadable region 5 (this will be mentioned later). A small space thus formed has an effect that the cutting position may be recognized visually during the time of cutting a rolled pattern-printed sheet into pattern-printed sheets.

FIG. 2 is a cross section showing one embodiment of the pattern-printed sheet of the present invention, and is a Y-Y cross section view of FIG. 2. As shown in FIG. 2, the pattern-printed sheet 1 of the present invention is configured by the laminate comprising on the substrate 10: the precoat layer 11, the dot-printed layers 12 and 13, the primer layer 14, and the surface protective layer 15 comprising a cross-link-hardened curable resin composition in this order. The dot-printed layers 12 and 13 are formed on the precoat layer 11 such that they may not overlap with each other. The dot-printed layer 12 forms the optically readable region 3 which is printed with the dot pattern 2 optically readable by an input terminal (see FIG. 1); and the dot-printed layer 13 forms the optically unreadable region 5 which is printed with the dot pattern 4 optically unreadable by an input terminal (see FIG. 1)

In the printed sheet of the present invention, in order to obtain both functions as a projection screen and a mark-erasing ability on the surface thereof as a white board, the 60° gloss value is preferably in the range of 10 to 75; or in view of the mark-erasing ability as an important characteristic thereof, the 60° gloss value is more preferably 25 or more.

As to the substrate 10 of the present invention, there is no particular restriction provided it is used as a usual printed sheet; and thus, a paper, a synthetic paper, a plastic film, and the like may be used; however, generally, a plastic film may be used suitably.

As to the plastics, various synthetic resins may be mentioned. Illustrative example of the synthetic resin includes polyolefin resins such as polyethylene, polypropylene, polymethyl pentene, and olefin-based thermoplastic elastomer; vinyl resins such as polyvinyl chloride, polyvinylidene chloride, and ethylene-vinyl alcohol copolymer; polyester resins such as polyethylene terephthalate, polybutylene terephthalate, polyethylene naphthalate, and polyester-based thermoplastic elastomer; acryl resins such as methyl poly(meth)acrylate, ethyl poly(meth)acrylate, and butyl poly(meth)acrylate; polyamide resins represented by nylon 6, nylon 66, and the like; triacetate cellulose resin, cellophane; polystyrene; polycarbonate resin; and polyarylate resin.

Among them, polyester resins are preferable because these resins have a certain level of strength that is required in order to protect a pattern (this will be mentioned later) against a thermal shock and a physical impact. Illustrative example of the polyester resin includes polyarylate, polycarbonate, ethylene terephthalate-isophthalate copolymer, and polyarylate, in addition to polyethylene terephthalate (hereinafter, this is sometimes referred to as "PET"), polybutylene terephthalate, and polyethylene naphthalate. Among them, polyethylene terephthalate and polybutylene terephthalate are preferable, while polyethylene terephthalate is especially preferable because of low cost and easy handling such as outstanding printing workability and post-processing suitability.

Thickness of the substrate 10 is not particularly restricted and may be set arbitrarily in accordance with the product characteristics; however, thickness is preferably in the range of 25 to 400 μm. This range is preferable, because a concavity is not readily formed by a pen pressure when writing is made by a pen tip such as a hard tip of an electronic pen as an input terminal (this will be mentioned later). In addition, this range is preferable because of outstanding workability during the time of lamination thereof with a substrate such as a steel plate and a magnet sheet. From the above view points, thickness of the substrate 10 is more preferably in the range of 75 to 250 μm. In addition, in the synthetic resin used in the substrate 10, an additive may be added as necessary. Illustrative example of the additive includes a filler, a flame retardant, an antioxidant, a sliding agent, a blowing agent, a UV absorber, and a light-stabilizer.

Meanwhile, the pattern-printed sheet 1 of the present invention may be used for various applications; however, if it is used as a white board and a projection screen, which are most favorable uses thereof, color of the substrate 10 is preferably white; and therefore, it is preferable that colorants such as calcium carbonate, titanium oxide, mica, talc, and the like be added therein.

In addition, as a preferable alternative embodiment, by using a transparent or a semitransparent substrate as the substrate 10, a bonding substrate (not shown by drawing) may be laminated on the backside of the substrate 10 (the opposite side of the dot-printed layers 12 and 13) via an adhesive layer (not shown by drawing).

In order to enhance adhesion with other layers, if necessary, the substrate 10 may be subjected to on its one side or both sides a primer treatment such as a physical or a chemical surface treatment including an oxidation method and a roughing method. Illustrative example of the oxidation method includes a corona discharge treatment, a chromium oxidation treatment, a flame treatment, a hot-air treatment, and an ozone-UV treatment; and illustrative example of the roughing method includes a sand blast method and a solvent treatment method. These surface treatments may be selected arbitrarily in accordance with the kind of the substrate; however, generally a corona discharge method is used preferably because of its effect, workability, and so forth.

In the present invention, a primer coating treatment is preferably used as a chemical surface treatment. In the primer coating treatment, a layer of a resin and the like is coated on the substrate so as to enhance the adhesion thereof, wherein the coating treatment by a polyurethane-based resin and the like may be mentioned as the example thereof. A polyurethane-based resin such as a urethane urea resin, in addition to usual urethane resins, may be used, too. The coating amount thereof is usually in the range of about 0.01 to about 0.5 g/m$^2$, or preferably in the range of 0.03 to 0.3 g/m$^2$. The said polyurethane-based resin is preferably crosslinked; and illustrative example of the crosslinking agent includes a melamine-based crosslinking agent and an epoxy-based crosslinking agent.

In the pattern-printed sheet 1 of the present invention, the precoat layer 11 is formed on the substrate 10. The surface wet tensional force of the precoat layer 11 is preferably in the range of 30 to 60 mN/m as measured in accordance with the method stipulated in JIS K6768.

In the pattern-printed sheet 1 of the present invention, by interposing the precoat layer 11 having the surface wet tensional force of 30 to 60 Nm/m between the substrate 10 and the dot-printed layers 12 and 13, the dot-printed layer 12 having the optically readable dot pattern 2 with high reading precision within the prescribed optically readable dot size (the dot diameter of 80 to 130 μm) could be formed more readily in the optically readable region 3. In other words, by controlling the surface wet tensional force of the precoat layer 11, it became possible to control the variance of the dot diameter and the form thereof in the dot-printed layer 12. As a matter of course, it is obvious that also control of the form of the optically unreadable dot pattern 4 formed in the optically unreadable region 5 in the dot-printed layer 13 became possible more readily.

If the surface wet tensional force of the precoat layer 11 is 30 mN/m or more, it is possible to avoid the decrease in adhesion with the dot-printed layers 12 and 13 and with the primer layer 14. On the other hand, if the tensional force is 60 mN/m or less, it is possible to avoid more readily for the dot diameter to exceed its upper limit caused by spreading-out of the ink in the wet state immediately after the dot-printed layer 12 is printed.

The precoat layer 11 of the present invention comprises a resin composition comprising titanium oxide and at least one resin selected from a polyurethane resin and an acryl polyol resin. The polyurethane resin used in the precoat layer 11 may be any of a thermosetting polyurethane resin and a thermoplastic polyurethane resin; however, a thermosetting polyurethane resin is preferable. This is because adhesion of an ink in the resin composition used in the precoat layer 11 with the substrate 10 can be enhanced.

As to the thermosetting polyurethane resin, any of a two-component cure type and a one-component cure type may be used; however, the two-component cure type polyurethane resin is preferable.

The two-component cure type polyurethane resin is a polyurethane resin comprising a polyol as a main agent and a polyisocyanate as a crosslinking agent (curing agent), wherein polyols having two or more hydroxy groups per one molecule such as, for example, polyethylene glycol, polypropylene glycol, acryl polyol, polyester polyol, polyether polyol, polycarbonate polyol, polycaprolactone polyol, and polyurethane polyol may be used. On the other hand, polyisocyanates having two or more isocyanate groups per one molecule such as, for example, aromatic isocyanate such as 2,4-tolylene diisocyanate, xylene diisocyanate, naphthalene diisocyanate, and 4,4'-diphenylmethane diisocyanate may be used; or aliphatic (or alicyclic) isocyanate such as 1,6-hexamethylene diisocyanate, 2,2,4-trimethylhexamethylene diisocyanate, isophorone diisocyanate, hydrogenated tolylene diisocyanate, and hydrogenated diphenylmethane diisocyanate may be used. Alternatively, an adduct or an oligomer of the above-mentioned various polyisocyanates such as, for example, an adduct of tolylene diisocyanate and a trimer of tolylene diisocyanate may be used as the polyisocyanates.

The thermoplastic polyurethane resin is a copolymer formed by copolymerizing monomers by means of a urethane bond formed by condensation of a compound having an isocyanate group with a compound having a hydroxy group such as an alcohol group.

The acryl polyol resin is a polymer having a hydroxy-containing (meth)acryl monomer unit such as poly(hydroxyethyl methacrylate).

It is preferable that the resin composition to form the precoat layer 11 of the present contain titanium oxide.

In order to control the surface wet tensional force of the precoat layer 11 within the range of 30 to 60 mN/m, the oil-absorbing capacity of titanium oxide to be contained therein is preferably in the range of 10 to 48 mL/100-g. If the oil-absorbing capacity of titanium oxide is made lower, the surface wet tensional force of the precoat layer 11 may be made lower; and if the oil-absorbing capacity of titanium oxide is made higher, the surface wet tensional force of the precoat layer 11 may be made higher. Namely, the surface wet tensional force of the precoat layer 11 may be controlled by the oil-absorbing capacity of titanium oxide.

Content of titanium oxide is preferably in the range of 40 to 90% by mass in the total resin composition to form the precoat layer 11. If the content thereof is 40% or more, a concealing effect may be obtained; on the other hand, if the content thereof is 90% or less, not only sufficient strength as the layer but also outstanding printing suitability may be obtained. Further, the content thereof is more preferably in the range of 45 to 90% by mass. Content of 45% or more by mass is preferable because of the concealing effect of the substrate; and content of 90% or less by mass is preferable because the printing suitability can be obtained, and in addition, titanium oxide can be stably supported to the resin of the precoat layer after the dot-printed layer is formed. From the above view points, the content thereof is still more preferably in the range of 45 to 85% by mass.

Thickness of the precoat layer 11 is not particularly restricted, though it is preferably in the range of 1 to 20 μm. Thickness of 1 μm or more is preferable because of concealing effect of the substrate; and thickness of 20 μm or less is preferable because of advantageous effects of printing adaptability, manufacturing cost, and workability. From the above view points, thickness of the precoat layer 11 is more preferably in the range of 1 to 10 μm.

Coating method of the precoat layer 11 is not particularly restricted; and thus, a heretofore known method such as a gravure coating method, a bar coating method, a roll coating method, a reverse roll coating method, a comma coating method, and the like may be used.

In the pattern-printed sheet 1 of the present invention, the dot-printed layers 12 and 13 are formed on the precoat layer 11. Material of the optically readable dot pattern 2 in the dot-printed layer 12 is not particularly restricted provided that the material can be detected by an input terminal as to the contrast between the pattern-formed part and the pattern non-formed part in the optically readable region 3; and for example, a material usually used as a colorant in a decorative sheet and the like may be used.

Specific example of the colorant includes inorganic pigments such as carbon black (charcoal), iron black, titanium white, antimony white, yellow iron oxide, chrome yellow, titanium yellow, red iron oxide, chrome vermilion, cadmium yellow, cadmium red, ferrocyanide, ultramarine, and cobalt blue; organic pigments or dyes such as quinacridone red, isoindolinone yellow, phthalocyanine blue, and phthalocyanine green; metal pigments in the scale form of a foil piece such as aluminum and brass; and pearl-like glossy pigments in the scale form of a foil piece such as mica covered with titanium dioxide and basic lead carbonate. These may be used solely or as a mixture of them.

As to the ink used to form the dot-printed layer 12, the above-mentioned colorant containing a binder may be used after it is arbitrarily mixed with an extender pigment, a solvent, a stabilizer, a plasticizer, a catalyst, a curing agent, and the like. There is no particular restriction as to the binder, while illustrative example thereof includes a polyurethane-based resin, a vinyl chloride/vinyl acetate-based copolymer resin, a vinyl chloride/vinyl acetate/acryl-based copolymer resin, a vinyl chloride/acryl-based copolymer resin, a chlorinated polypropylene-based resin, an acryl-based resin, a polyester-based resin, a polyamide-based resin, a butyral-based resin, a polystyrene-based resin, a nitrocellulose-based resin, and a cellulose acetate-based resin; these may be used solely or as an arbitrary mixture of two or more of them.

A pigment having a high concealing effect, such as for example, carbon black, is preferable.

The printing method for the dot-printed layer 12 is not particularly restricted; and thus, heretofore known methods may be used. Illustrative example thereof includes a gravure printing method, an off-set printing method, a flexographic printing method, a mimeographic printing method, and an ink jet printing method. Among them, the gravure printing method is preferable because of fast printing speed and high productivity. Because the dot-printed layer 13 is formed by the same printing plate as the dot-printed layer 12 as mentioned later, the same ink as the ink in the dot-printed layer 12 is used. According to the present invention, printing can be done satisfactorily even with the gravure printing method which has been considered difficult; and in addition, by arranging the dot-printed layer 12 and the dot-printed layer 13, the dot-printed layer 12 can be printed further satisfactorily.

Next, in the printed sheet of the present invention, in order to enhance the adhesion of the dot-printed layers 12 and 13 and of the precoat layer 11 with the surface protective layer 15, a primer layer 14 is formed. By enhancing the adhesion strength, removal of the dots due to surface friction may be prevented from occurring even if a water-based ink or a one-component curable ink, which are poor in adhesion with the substrate, is used in the dot pattern.

There is no particular restriction as to the resin composition to constitute the primer layer 14; however, in order to enhance the adhesion as mentioned above and in view of readability of the dots in the final product, a two-component cure type resin which is colorless or a semitransparent milky white is preferable, though a two-component cure type urethane resin is especially preferable.

The two-component cure type urethane resin is a urethane resin comprising a polyol as a main agent and a polyisocyanate as a crosslinking agent (curing agent), wherein polyols having two or more hydroxy groups per one molecule such as, for example, polyethylene glycol, polypropylene glycol, acryl polyol, polyester polyol, polyether polyol, polycarbonate polyol, and polyurethane polyol may be used.

On the other hand, polyisocyanates having two or more isocyanate groups per one molecule such as, for example, aromatic isocyanates such as 2,4-tolylene diisocyanate, xylene diisocyanate, naphthalene diisocyanate, and 4,4'-diphenylmethane diisocyanate, or aliphatic (or alicyclic) isocyanates such as 1,6-hexamethylene diisocyanate, 2,2,4-trimethylhexamethylene diisocyanate, isophorone diisocyanate, hydrogenated tolylene diisocyanate, and hydrogenated diphenylmethane diisocyanate may be used. Alternatively, an adduct or an oligomer of the above-mentioned various polyisocyanates such as, for example, an adduct of tolylene diisocyanate and a trimer of tolylene diisocyanate may be used as the polyisocyanates.

In the primer layer 14, in order to prevent discoloration of the sheet from occurring during passage of time, a weatherability enhancer to enhance the weatherability thereof may be added provided that the addition thereof does not impair the sheet performance (this will be discussed later); and the weatherability enhancer that can be used may be exemplified by a UV absorber and a light stabilizer. As to the UV absorber, any of an inorganic and an organic UV absorber may be used; and the inorganic UV absorber that can be preferably used may be exemplified by titanium dioxide, a cerium oxide, and zinc oxide, with the respective average particle diameters thereof being in the range of about 5 to about 120 nm. As to the organic UV absorber, a benzotriazole-based UV absorber may be exemplified; and specific example thereof includes 2-(2-hydroxy-5-methylphenyl) benzotriazole, 2-(2-hydroxy-3,5-di-tert-amylphenyl) benzotriazole, and an ester of polyethylene glycol with 3-[3-(benzotriazole-2-yl)-5-tert-butyl-4-hydroxyphenyl]propionic acid. As to the light stabilizer, a hindered amine-based light stabilizer may be exemplified; and specific example thereof includes bis(1,2,2,6,6-pentamethyl-4-piperidyl) 2-(3,5-di-tert-butyl-4-hydroxybenzyl)-2'-n-butyl malonate, bis(1,2,2,6,6-pentamethyl-4-piperidyl) sebacate, and tetrakis(2,2,6,6-tetramethyl-4-piperidyl)-1,2,3,4-butanetetracarboxylate.

The blending amount of the weatherability enhancer is in the range of about 1 to about 50% by mass, preferably in the range of 3 to 40% by mass, or more preferably in the range of 5 to 25% by mass in the totality of the resin composition to constitute the primer layer 14.

There is no particular restriction as to the thickness of the primer layer 14; however, the thickness thereof is preferably in the range of 1 to 10 µm. Thickness of 1 µm or more is advantageous in view of protection of the dot-printed layers 12 and 13 against surface friction; on the other hand, if thickness thereof is 10 µm or less, an adverse effect to the dot pattern due to the conceal action of an inorganic additive contained in the primer layer or due to the refractive index of the resin that constitutes the primer layer can be suppressed so that recognition of the electronic pen (input terminal) with regard to the location information may not be impaired. From the above view points, thickness of the primer layer 14 is more preferably in the range of 1 to 5 µm.

Coating method of the primer layer 14 is not particularly restricted; and thus, a heretofore known method such as a gravure coating method, a bar coating method, a roll coating method, a reverse roll coating method, a comma coating method, and the like may be used.

Next, the surface protective layer 15 is constituted by a crosslink-hardened curable resin composition. As to the curable resin composition, a thermosetting resin composition may be used; however, a resin composition curable by an ionizing radiation beam is preferable, while a resin composition curable by an electron beam is especially preferable.

The thermosetting resin used in the thermosetting resin composition to form the surface protective layer 15 may be exemplified by a polyester resin, an epoxy resin, a thermosetting polyurethane resin, an aminoalkyd resin, a melamine resin, a guanamine resin, a urea resin, and a thermosetting acryl resin. Among them, a thermosetting polyurethane resin is preferably used.

In the present invention, the resin curable by an ionizing radiation beam means a resin that is crosslink-hardenable by irradiating, among electromagnetic beams or charged particle beams, a beam having an energy quantum capable of crosslinking and polymerizing the molecules, namely, it means a resin that is crosslink-hardenable by irradiating a UV beam or an electron beam. Specifically, a resin arbitrarily selected from a polymerizable monomer, a polymerizable oligomer, and a prepolymer which are usually used as a resin curable by an ionizing radiation beam may be used.

Typically, as to the polymerizable monomer, a (meth) acrylate-type monomer having a radical polymerizable unsaturated group in its molecular structure is preferable; especially, a polyfunctional (meth)acrylate is preferable. Meanwhile, "meth(acrylate)" herein means "acrylate or methacrylate"; and the same is applied for other analogues thereof. As to the polyfunctional (meth)acrylate, there is no particular restriction provided that the (meth)acrylate has two or more ethylenic unsaturated bonds in a molecule. These polyfunctional (meth)acrylates may be used solely or as a combination of two or more of them.

The polymerizable oligomer may be exemplified by an oligomer having a radical polymerizable unsaturated group in its molecular structure, such as for example, an epoxy (meth)acrylate type, a urethane (meth)acrylate type, a polyester (meth)acrylate type, and a polyether (meth)acrylate type. Here, the oligomer of an epoxy (meth)acrylate type may be obtained by, for example, reacting a (meth)acrylic acid for esterification with an oxirane ring of a bisphenol-type epoxy resin or a novolak-type epoxy resin, these resins having comparatively low molecular weights. A carboxy-modified epoxy (meth)acrylate oligomer obtained by partially modifying the oligomer of an epoxy (meth)acrylate type with a dibasic carboxylic acid anhydride may also be used. The oligomer of a urethane (meth)acrylate type may be obtained by, for example, esterifying a (meth)acrylic acid with a polyurethane oligomer obtained by reacting a polyether polyol or a polyester polyol with a polyisocyanate. The oligomer of a polyester (meth)acrylate type may be obtained by, for example, esterifying a (meth)acrylic acid with the OH group of a polyester oligomer having OH groups in its both terminals which is obtained by condensation of a polyvalent carboxylic acid with a polyvalent alcohol, or by esterifying a (meth)acrylic acid with the terminal OH group of an oligomer obtained by adding an alkylene oxide to a polyvalent carboxylic acid. The oligomer of a polyether (meth)acrylate type may be obtained by, for example, esterifying a (meth)acrylic acid with the OH group of a polyether polyol.

In addition to the foregoing examples, the polymerizable oligomer may be exemplified by a highly hydrophobic oligomer of a polybutadiene (meth)acrylate type having a (meth)acrylate group at the side chain of a polybutadiene oligomer, an oligomer of a silicone (meth)acrylate type which has a polysiloxane bond in its main chain, an oligomer of an aminoplast resin (meth)acrylate type which is obtained by modifying an aminoplast resin having many reactive groups in its small molecule, and an oligomer having an cationic polymerizable functional group in a molecule of a novolak-type epoxy resin, a bisphenol-type epoxy resin, an aliphatic vinyl ether, an aromatic vinyl ether, and the like.

In the present invention, in order to decrease viscosity of the above-mentioned polyfunctional (meth)acrylate or for other reason, a monofunctional (meth)acrylate may be arbitrarily used together with the polyfunctional (meth)acrylate within the range not impairing the object of the present invention. These monofunctional (meth)acrylates may be used solely or as a combination of two or more of them.

The number-average molecular weight (polystyrene-equivalent number-average molecular weight measured by GPC) of the resin curable by an ionizing radiation beam is preferably in the range of 1,000 to 10,000, or more preferably in the range of 2,000 to 10,000. If the number-average molecular weight is within the foregoing range, the coating composition is afforded with excellent workability and suitable thixotrophy so that the surface protective layer may be formed readily.

If a UV-curable resin composition is used as the resin curable by an ionizing radiation beam, it is preferable that a photo-polymerization initiator be added in the range of about 0.1 to about 5 parts by mass relative to 100 parts by mass of the resin composition. There is no particular restriction as to the photo-polymerization initiator; and thus, any initiator that has been conventionally used may be arbitrarily chosen.

In the present invention, the resin composition curable by an electron beam is especially preferably used as the curable resin composition. This is because the resin composition curable by an electron beam can be used without a solvent so that this is preferable from environmental and health view points; and in addition, this composition does not require a photo-polymerization initiator, and yet has stable hardening characteristics. There is no particular restriction as to the coating method of the curable resin composition; and thus, a heretofore known method such as a gravure coating method, a bar coating method, a roll coating method, a reverse roll coating method, a comma coating method, and the like may be used. The coating amount thereof is preferably in the range of 1 to 20 μm.

The curable resin composition in the present invention may contain a filler. Material and content of the filler is determined in relation with the substrate to be used, the resin composition to constitute the primer layer, and so forth, wherein these are selected such that the 60° surface gloss value of the pattern-printed sheet of the present invention may become preferably in the range of 10 or more to 75 or less.

There is no particular restriction as to material of the filler provided that the 60° gloss value is within this range; and thus, any of an inorganic filler and an organic filler may be used.

Illustrative example of the inorganic filler includes calcium carbonate, magnesium carbonate, fly ash, dehydrated waste mad, natural silica, synthetic silica, kaolin, clay, calcium oxide, magnesium oxide, titanium oxide, zinc oxide, barium sulfate, calcium hydroxide, aluminum hydroxide, alumina, magnesium hydroxide, talc, mica, hydrotalcite, aluminum silicate, magnesium silicate, calcium silicate, burnt talc, wollastonite, potassium titanate, magnesium sulfate, calcium sulfate, magnesium phosphate, sepiolite, xonolite, aluminum borate, silica balloon, glass flake, glass balloon, silica, iron slag, copper, iron, iron oxide, carbon black, sendust, alnico magnet, magnet powders of various ferrites, cement, glass powders, silica sand, antimony trioxide, magnesium oxysulfate, hydrated aluminum, hydrated gypsum, and alum.

Meanwhile, these inorganic fillers may be used solely or as a mixture of two or more of them.

Illustrative example of the organic filler includes polyolefin resins such as polyethylene and polypropylene; a fluorinated resin; a styrenic resin; an epoxy-type resin; a melamine-type resin; a urea-type resin, an acryl-type resin; a phenol-type resin; a polyimide-type resin; a polyamide-type resin; and a polyester-type resin. Alternatively, copolymers of the above-mentioned resins may also be used. Among them, in view of the performance as a white board, or more specifically, in order to prevent contamination of the filler's color by a marker from occurring upon writing and erasing, an organic filler formed by a urea-type resin is preferable.

In addition, in view of stability of the filler after hardening of the curable resin, it is preferable that the filler have the chemical composition having the reactive group in the curable resin.

Further, in order to obtain satisfactory functions as a projection screen, it is preferable that the organic filler be amorphous and have a sufficient oil-absorbing capacity.

Meanwhile, these organic fillers may be used solely or as a combination of two or more of them.

As mentioned above, content of the filler in the curable resin composition is selected such that the 60° surface gloss value of the pattern-printed sheet may become preferably in the range of 10 or more to 75 or less, though the optimum range thereof is different depending on the material to be used and the like. In general, there is a tendency that the 60° gloss value becomes lower when content of the filler is increased while the gloss value becomes higher when the content thereof is decreased.

More specifically, the amount of the filler is preferably in the range of 0.5 or more parts by mass to less than 12 parts by mass, more preferably in the range of more than 0.5 parts by mass to less than 12 parts by mass, or still more preferably in the range of 0.6 or more parts by mass to less than 12 parts by mass, relative to 100 parts by mass of the curable resin; especially in the case of the organic filler, the amount thereof is preferably in the range of 0.5 to 11 parts by mass, or more preferably in the range of 0.6 to 11 parts by mass, relative to 100 parts by mass of the curable resin.

The average particle diameter of the filler is selected such that the 60° surface gloss value of the pattern-printed sheet may become preferably in the range of 10 or more to 75 or less, and generally the diameter thereof is preferably in the range of 0.5 to 10 μm. If the average particle diameter thereof is 0.5 μm or more, sufficient matting effect of the surface protective layer may be obtained so that the function as the projection screen can be fully realized. On the other hand, if the diameter thereof is 10 μm or less, roughness of the surface on the surface protective layer upon forming thereof may be made smooth; and thus, writing by a white board marker can be made smoothly, and in addition, the mark can be erased by an eraser without its trace. From the above view points, the average particle diameter of the filler is more preferably in the range of 1 to 7 μm.

If so desired, the pattern-printed sheet 1 of the present invention may be laminated with a bonding substrate (not shown by drawing) on the backside of the substrate 10 (the opposite side of the dot-printed layers 12 and 13) via an adhesive layer (not shown by drawing).

The adhesive used in the adhesive layer may be arbitrarily selected from those that are heretofore known or commercially available in accordance with the component to constitute the substrate 10, the bonding substrate, and the like. Illustrative example thereof includes thermosetting resins such as a polyester-type resin, a polyurethane-type resin, a polyester-urethane-type resin, and an epoxy-type resin, in addition to polyolefin resins such as polyethylene and polypropylene. These resins may be used also in the state of an emulsion.

Among them, in view of heat resistance, an adhesive of the urethane-type resin is preferable. The preferable adhesive of the urethane-type resin may be exemplified by a two-component cure type urethane resin comprising a polyol as a main agent and an isocyanate as a crosslinking agent (curing agent).

Adhesion may be done by a heretofore known method in accordance with the kind of the adhesive to be used. The substrate 10 and the bonding substrate may be laminated by a dry laminating method after applying an adhesive or by a hot press method using an adhesive that is adherable by hot press.

Thickness of the adhesive layer is usually in the range of about 0.1 to about 30 μm, though depending on the kind and the like of the adhesive to be used.

As to the bonding substrate, those having preferably 7 or less, or more preferably 5 or less, as the 60° surface gloss value of the side of the substrate 10 may be used. By so doing, even in the case that filler content in the surface protective layer 15 is comparatively small, the 60° surface gloss value in the entire pattern-printed sheet may be made in the range of 10 or more to 75 or less.

As to the bonding substrate, the same material as the substrate 10 as mentioned before may be used. The bonding substrate colored by containing a colorant or the like may be used. As to the colorant used in the bonding substrate, there is no particular restriction provided that an input terminal can recognize the contrast between the pattern-formed part of the dot-printed layer 12 and the bonding substrate; and thus, a colorant in accordance with the wavelength that can be read by an input terminal may be used. Illustrative example of the colorant like this includes inorganic pigments such as calcium carbonate, titanium oxide, mica, talc, antimony white, yellow iron oxide, chrome yellow, titanium yellow, red iron oxide, chrome vermilion, cadmium yellow, cadmium red, ferrocyanide, ultramarine, and cobalt blue; organic pigments or dyes such as quinacridone red, isoindolinone yellow, phthalocyanine blue, and phthalocyanine green; metal pigments in the scale form of a foil piece such as aluminum and brass; and pearl-like glossy pigments in the scale form of a foil piece such as mica covered with titanium dioxide and basic lead carbonate. Similarly to the substrate 10, white colorants such as calcium carbonate, titanium oxide, mica, talc, and the like are preferable.

The pattern-printed sheet of the present invention may have an arbitrary figure pattern by further arranging a figure pattern layer (not shown by drawing). The figure pattern may be formed between the primer layer 14 and the dot-printed layer 12 and the dot-printed layer 13 on the backside of the substrate 10 (rear surface of the substrate 10, namely, between the substrate 10 and the adhesive layer, or between the adhesive layer and the bonding substrate) or the like.

As to the colorant used for forming the figure pattern layer, there is no particular restriction provided that an input terminal can recognize the contrast between the pattern-formed part of the dot-printed layer 12 and the bonding substrate; and thus, the colorant may be selected in accordance with the detection light of an input terminal, the colorant to form the dot-printed layer 12, the colorant contained in the substrate 10 and the bonding substrate, and the like. Illustrative example the colorant like this includes inorganic pigments such as titanium white, antimony white, yellow iron oxide, chrome yellow, titanium yellow, red iron oxide, chrome vermilion, cadmium yellow, cadmium red, ferrocyanide, ultramarine, and cobalt blue; organic pigments or dyes such as quinacridone red, isoindolinone yellow, phthalocyanine blue, and phthalocyanine green; metal pigments in the scale form of a foil piece such as aluminum and brass; and pearl-like glossy pigments in the scale form of a foil piece such as mica covered with titanium dioxide and basic lead carbonate.

It is preferable that the pattern-printed sheet of the present invention have the pencil hardness of 2B or higher in its surface. If the pencil hardness thereof is 2B or higher, not only excellent scratch resistance may be obtained, but also it is difficult to form a concavity by a pencil pressure when writing is done by a hard pen tip such as a pen tip of an electronic pen, an input terminal. In view of the above-mentioned, the pencil hardness thereof is more preferably B or higher.

As to the input terminal usable in the present invention, there is no particular restriction provided that it can recognize the contrast between the pattern-formed part and the pattern non-formed part of the dot-printed layer 12; and thus, it is allowed if a heretofore known sensor is arranged therein.

The location information is calculated from the continuously sensed data that are read by the input terminal; and then, this information is combined with the time information thereby providing it as the input trajectory data that can be dealt with by an information processing device.

Meanwhile, these devices are not particularly restricted provided that they are provided with the members such as a processor, a memory, a communication interface, a battery, and so forth.

The processing device for the read data may be stored in the input terminal or in an external information processing device.

FIG. 3 shows another embodiment of the pattern-printed sheet of the present invention, and is a plane view of the pattern-printed sheet in the rolled state. As shown in FIG. 3, the pattern-printed sheet 1' according to the other embodiment is in the rolled state, and thus it is different from the pattern-printed sheet 1 according to the one embodiment, which is in the state of a sheet, while other aspects are the same therebetween. The pattern-printed sheet 1' comprises, as shown in FIG. 3, a plurality of the optically readable region 3 which is printed with the dot pattern 2 optically readable by the input terminal and a plurality of the optically unreadable region 5 which is printed with the dot pattern 4 optically unreadable by the input terminal, wherein a plurality of the optically readable region 3 and a plurality of the optically unreadable region 5 are formed alternately on the substrate 10. The pattern-printed sheet 1' in the rolled state is cut in accordance with the use thereof in a later processing step, and then it is used by bonding with a magnet sheet, a wooden plyboard, a decorative board, and so forth; or it is used by cutting after bonding to these substrates.

By referring to FIG. 2 and FIG. 4, the method for manufacturing the pattern-printed sheet of the present invention will be explained.

In the pattern-printed sheet 1 of the present invention, as shown in FIG. 2, the precoat layer 11 is formed by the process in which a resin composition comprising titanium oxide and at least one resin selected from a polyurethane resin and an acryl polyol resin is applied on the substrate 10, which is then followed by drying thereof. As to the coating method, a heretofore known method such as a gravure coating method, a bar coating method, a roll coating method, a reverse roll coating method, a comma coating method, and the like may be used.

Next, the step of forming the dot-printed layers 12 and 13 on the precoat layer 11 will be explained.

FIG. 4 is a diagrammatic perspective view showing an outer appearance of the printing plate, i. e., the printing plate 20 to form the dot-printed layers 12 and 13, which is used to manufacture the pattern-printed sheet of the present invention, having the optically readable region-forming part and the optically unreadable region-forming part on surface of the gravure printing cylinder in the circumferential direction.

As shown in FIG. 4, the printing plate 20 is configured such that the optically readable region-forming part 23 which is engraved with the dot pattern 22 optically readable by the input terminal, the said cylinder having a cylinder form or a shafted-cylinder form having the shafts on the both ends, may be arranged in one line and one sheet in a prescribed area on surface of the metal-made gravure printing cylinder 21 in the circumferential direction thereof; and between the both ends in the circumferential direction of the optically readable region-forming part 23, the optically unreadable region-forming part 25 which is engraved with the dot pattern 4 optically unreadable by the input terminal may be arranged on surface of the same gravure printing cylinder 21.

Formation of on the printing plate 20, the optically readable region-forming part 23, the optically unreadable region-forming part 25, and the phototube mark-forming part 26 may be done by an electron engraving method, a resist-using corrosion method, or the like. In this example, the widths in perpendicular to the circumferential direction of the optically readable region-forming part 23 and the optically unreadable region-forming part 25 (width direction) are made such that the width of the optically unreadable region-forming part 25 may become a little bit smaller than the other; but the sizes thereof are not particularly restricted, so that the same size may be allowed. Meanwhile, a corn hole part or a shaft-attaching part in the end of the gravure printing cylinder 21 is not shown in the drawing. For the sake of easy recognition of the figure, only one side of the phototube mark-forming part is shown, not showing the other side.

By using the printing plate 20 mentioned above, the dot pattern 2 optically readable by the input terminal and the dot pattern 4 optically unreadable by the input terminal are gravure-printed on the precoat layer 11 to form the dot-printed layer 12, which becomes the optically readable region 3, and between the optically readable regions 3, the dot-printed layer 13, which becomes the optically unreadable region 5. The present invention is characterized by that the optically readable region-forming part 23, which is engraved with the optically readable dot pattern 22, and the optically unreadable region-forming part 25, which is engraved with the optically unreadable dot pattern 4, are arranged on surface of the same gravure printing cylinder 21. By so doing, bouncing of the doctor in the posterior edge "t" of the optically readable region-forming 23 in the rotation direction (arrow direction in the drawing) of the printing plate 20 can be prevented from occurring, so that the ink to print the dot does not spread out to the printing direction in the boundary of the posterior edge "T" (see FIG. 1) of the optically readable region in the boundary of the optically readable region 3 and the optically unreadable region 5 which are formed by printing on the substrate 10, thereby providing the manufacturing method having outstanding reproducibility of the dot pattern edge.

On the dot-printed layers 12 and 13 is formed the primer layer 14. The primer layer 14 may be formed by applying the resin composition by using a heretofore known method such as a gravure coating method, a bar coating method, a roll coating method, a reverse roll coating method, a comma coating method, and the like, which is followed by drying.

On the primer layer 14 is formed the uncured surface protective layer by applying the curable resin composition. Thereafter, the curable resin composition of the uncured surface protective layer is cured by crosslinking to form the surface protective layer 15.

EXAMPLES

Hereunder, the present invention will be explained in more detail by Examples; however, the present invention is not limited at all by these Examples.
Evaluation Methods:
(1) Oil-Absorbing Capacity of Titanium Oxide (mL/100-g)

Boiled linseed oil was added in drops to 2 g of titanium oxide placed on a glass plate with well mixing them by using a spatula; and then, the amount (unit: g) of the boiled linseed oil (in terms of 100 g of titanium oxide) that is added until a mixture of boiled linseed oil and titanium oxide becomes a paste form with a certain shape is taken.
(2) Surface Wet Tensional Force of the Precoat Layer 11

The surface wet tensional force of the precoat layer 11 was measured in accordance with the method stipulated in JIS K6768.
(3) Dot Diameter By using an optical microscope (magnification of 100-folds), five dots in the observed area were arbitrarily chosen, and diameters of the respective dots in the plane view were measured; and then, the dot diameter was obtained from the arithmetic average thereof. The allowable dot diameter is in the range of 80 to 130 μm.
(4) Judgment of the Dot Pattern Reading Performance (this is Abbreviated as "APA" in Table 1 and Table 2)

With regard to the printed sheet obtained by each of Examples and Comparative Examples, whether the coordinate information of the dot pattern can be read or not was confirmed by using the Anoto pattern detection device APA DMS910IR (manufactured by TECHKON Co., Ltd.) and the dedicated software Anoto Pattern Analyzer. The judgment was done in accordance with following criteria.
1: The coordinate information could be read without problem by the foregoing dedicated reading device (the dot diameter was in the range of 90 to 120 μm).
2: The dot diameter was near the upper limit and the lower limit of the reading range (in the range of 80 to 130 μm) of the forgoing dedicated reading device (the dot diameter was in the range of 80 to 90 μm or in the range of 120 to 130 μm).

3: There were some parts whose coordinate information could not be read by the foregoing dedicated reading device.
4: The coordinate information could not be read by the foregoing dedicated reading device.
(5) Printing Suitability With regard to the pattern-printed sheet obtained in each of Examples and Comparative Examples, printing variance of the dot pattern optically readable by the input terminal formed in the optically readable region, and whether or not the ink to print the dot spread out to the printing direction in the posterior edge in the boundary of the optically readable region were checked visually. Printing suitability was evaluated based on whether or not there were such problems as printing variance, spreading-out of the ink, and the like; and if there were no problems as mentioned above, it was marked with G (good), and if there were such problems, it was marked with NG (not good).
(6) 60° Gloss Value The gloss of the printed sheet surface (60° gloss value) was measured with the incident light angle of 60° by using the gloss meter Micro-TRI-Gloss (manufactured by BYK-Gardner GmbH).

Example 1

As shown in Table 1, on surface of the white PET film having thickness of 125 μm (U2 L92W, manufactured by Teijin DuPont Films Japan Ltd.) was applied a white ink (HRA-NT White, manufactured by DIC Graphics Corp.), which is a two-component cure type polyurethane resin composition containing titanium oxide as a pigment, the polyurethane resin contained therein being comprised of an acryl polyol-type resin as a binder (main agent) and 1,6-hexamethylene diisocyanate (HMDI) as a curing agent with the mass ratio (main agent/HMDI) of (100/3), thereby obtaining a precoat layer 11 having the film thickness of 5 μm (in dry state).

Then, by using the printing plate having, on the same gravure printing cylinder surface, the optically readable region-forming part engraved with the dot pattern readable by the input terminal, and between the said optically readable region-forming parts, the optically unreadable region-forming part engraved with the dot pattern optically unreadable by the input terminal, the dot pattern was printed on surface of the precoat layer by using a gravure rotary printer by using a black ink comprising a vinyl chloride/vinyl acetate/acryl-based resin binder and a carbon black pigment (mixture of "EX500(NT) Black" (manufactured by Showa Ink Manufacturing Co., Ltd.) with "Chem X Chikisoseimezium 2" (manufactured by Showa Ink Manufacturing Co., Ltd.) with 95:5 mass ratio), thereby laminating the dot-printed layer 12 comprising the optically readable region 3 having the dot pattern optically readable by the input terminal and the dot-printed layer 13 formed of the optically unreadable region 5 having the dot pattern 4 optically unreadable by the input terminal. Meanwhile, the dot density of the dot pattern formed in the optically readable region was made 11 dots/mm$^2$, and the halftone dot concentration of the halftone tint of the dot pattern 4 optically unreadable by the input terminal in the dot-printed layer 13 formed of the optically unreadable region 5 was made 20%.

Then, a two-component cure type urethane resin comprising an acryl polyol-type resin (EBF Primer, manufactured by Showa Ink Manufacturing Co., Ltd.) as a binder (main agent) and 1,6-hexamethylene diisocyanate (HMDI) as a curing agent with the mass ratio (main agent/HMDI) of (100/15) was applied by the gravure coating method so as to laminate the primer layer with the layer thickness of 2.5 μM (in dry state).

Thereafter, a resin composition curable by an electron beam comprising 100 parts by mass of a resin curable by an electron beam, this resin being mainly comprised of an acrylate resin curable by an electron beam and a polyfunctional monomer (WBW Hard (average functional number of 4.0), manufactured by DIC Graphics Corp.), 3 parts by mass of silicone acrylate prepolymer (WBW Silicone Additive, manufactured by DIC Graphics Corp.), and 11 parts by mass of an organic filler comprising a urea type resin having average particle diameter of 5 μm was applied thereon by a gravure direct coater method so as to laminate a surface protective layer (uncured) with the film thickness of 3.0 μm (in dry state). After this application, an electron beam was irradiated with the acceleration voltage of 165 kV and the dose amount of 50 kGy (5 Mrad) to harden the resin composition curable by an electron beam to obtain a surface protective layer 15, thereby obtaining a pattern-printed sheet 1. The sheet thus obtained was evaluated by the aforementioned evaluation method; and the result thereof is shown in Table 1.

Examples 2 to 3

The procedure of Example 1 was repeated, except that, the halftone dot concentration of the halftone tint in the optically unreadable dot pattern 4 to be formed in the optically unreadable region 5 was changed as shown in Table 1, to obtain the pattern-printed sheet. The evaluation results obtained by the same evaluation method as Example 1 are shown in Table 1.

Examples 4 to 6

The procedure of Example 1 was repeated, except that the precoat layer was changed as shown in Table 1, to obtain a pattern-printed sheet. The evaluation results obtained by the same evaluation method as Example 1 are shown in Table 1.

Meanwhile, the polyurethane resin used in Example 4 was the two-component cure type polyurethane resin comprising a polyester polyol-type resin as a binder (main agent) and 1,6-hexamethylene diisocyanate (HMDI) as a curing agent with the mass ratio (main agent/HMDI) of (100/3). The mass ratio (main agent/HMDI) was (100/3).

The polyurethane resin used as the precoat layer in Example 6 was a mixture of 8.5% by mass of the two-component cure type polyurethane resin composition, comprising the acryl polyol-type resin used in Example 1 as a binder (main agent) and 1,6-hexamethylene diisocyanate (HMDI) as a curing agent with the mass ratio (main agent/HMDI) of (100/3), and 8.5% by mass of the two-component cure type polyurethane resin used in the precoat layer of Example 4.

Comparative Examples 1 to 3

The procedure of Example 1 was repeated, except that the halftone dot concentration of the halftone tint in the optically unreadable dot pattern 4 to be formed in the optically unreadable region 5 was changed as shown in Table 2, to obtain the pattern-printed sheet. The evaluation results obtained by the same evaluation method as Example 1 are shown in Table 2. Meanwhile, because the optically unreadable region 5 was not formed, "0%" was shown as the halftone concentration in Comparative Example 1.

Comparative Example 4

The procedure of Example 1 was repeated, except that the precoat layer was not laminated, to obtain the pattern-printed sheet. The evaluation results obtained by the same evaluation method as Example 1 are shown in Table 2.

TABLE 1

|  |  |  | Example | | | | | |
| --- | --- | --- | --- | --- | --- | --- | --- | --- |
|  |  |  | 1 | 2 | 3 | 4 | 5 | 6 |
| Halftone concentration of optically unreadable region (%) | | | 20 | 10 | 30 | 20 | 20 | 20 |
| Precoat layer | Resin component | Polyurethane resin (% by mass) | — | — | — | 12 | — | 8.5 |
| | | Acryl polyol resin (% by mass) | 11.5 | 11.5 | 11.5 | — | 11 | 8.5 |
| | Titanium oxide (% by mass) | | 55 | 55 | 55 | 50 | 54 | 38 |
| | Extender silica pigment (% by mass) | | — | — | — | — | — | 1 |
| | Oil-absorbing capacity of titanium oxide (mL/100-g) | | 17 | 17 | 17 | 25 | 20 | 50 |
| | Surface wet tensional force of precoat layer (mN/m) | | 35 | 35 | 35 | 42 | 43 | 64 |
| Printing suitability | | | G | G | G | G | G | G |
| APA Evaluation | Dot diameter (average value of 5 dots) (μm) | | 108 | 108 | 108 | 102 | 114 | 130 |
| | Judgment | | 1 | 1 | 1 | 1 | 1 | 3 |
| 60° Gloss value | | | 35 | 35 | 35 | 35 | 35 | 35 |

TABLE 2

|  |  |  | Comparative Example | | | |
| --- | --- | --- | --- | --- | --- | --- |
|  |  |  | 1 | 2 | 3 | 4 |
| Halftone concentration of optically unreadable region (%) | | | 0 (None) | 5 | 40 | 20 |
| Precoat layer | Resin component | Polyurethane resin (% by mass) | — | — | — | None |
| | | Acryl polyol resin (% by mass) | 11.5 | 11.5 | 11.5 | |
| | Titanium oxide (% by mass) | | 55 | 55 | 55 | |
| | Extender silica pigment (% by mass) | | — | — | — | |
| | Oil-absorbing capacity of titanium oxide (mL/100-g) | | 17 | 17 | 17 | |
| | Surface wet tensional force of precoat layer (mN/m) | | 35 | 35 | 35 | |
| Printing suitability | | | NG | NG | NG | G |
| APA Evaluation | Dot diameter (average value of 5 dots) (μm) | | 108 | 108 | 108 | 131 |
| | Judgment | | 1 | 1 | 1 | 4 |
| 60° Gloss value | | | 35 | 35 | 35 | 35 |

REFERENCE NUMERALS

1, 1': Pattern-printed sheet
2: Optically readable dot pattern
3: Optically readable region
4: Optically unreadable dot pattern
5: Optically unreadable region
6: Phototube mark
10: Substrate
11: Precoat layer
12, 13: Dot-printed layers
14: Primer layer
15: Surface protective layer
20: Printing plate
21: Gravure printing cylinder
22: Engraved optically readable dot pattern
23: Optically readable region-forming part
24: Engraved optically unreadable dot pattern-forming part
25: Optically unreadable region-forming part
26: Phototube mark-forming part
T: Posterior edge of optically readable region
t: Posterior edge of optically readable region-forming part.

The invention claimed is:

1. A pattern-printed sheet, comprising:
   a substrate;
   a precoat layer laminated on the substrate;
   a first region printed on the precoat layer and comprising a first dot pattern in which a pattern in one part differs from a pattern in another part such that locations of dots in the first dot pattern can be identified from a lay-out relation of the dots in the first dot pattern that is optically readable by an input terminal; and
   a second region printed on the precoat layer adjacent to and not overlapping the first region and comprising a second dot pattern, different from the first dot pattern, in which the dots are arranged in order such that locations of dots in the second dot pattern cannot be identified from a lay-out relation of the dots in the second dot pattern by an input terminal;
   wherein the second dot pattern comprises dots arranged in order and is a halftone tint having regularity whose halftone dot concentration is in the range of 10 to 30%.

2. The pattern-printed sheet according to claim 1, wherein a plurality of the first regions and a plurality of the second regions are formed alternately.

3. The pattern-printed sheet according to claim 1, wherein the dot pattern formed in the first region has the dots with the diameter of 80 to 130 μm and with the dot density of 5 to 20 dots/mm$^2$.

4. The pattern-printed sheet according to claim 1, wherein the pattern-printed sheet comprises on the substrate: the precoat layer, a dot-printed layer, a primer layer, and a surface protective layer comprising a crosslink-hardened curable resin composition in this order; wherein the precoat layer comprises a resin composition comprising titanium oxide and at least one resin selected from a polyurethane resin and an acryl polyol resin, and surface wet tensional force of the precoat layer is in the range of 30 to 60 mN/m as measured in accordance with the method stipulated in JIS K6768.

5. The pattern-printed sheet according to claim 4, wherein the dot-printed layer comprises a vinyl chloride/vinyl acetate/acryl-type copolymer resin which contains carbon black.

6. The pattern-printed sheet according to claim 4, wherein the primer layer comprises a hardened two-component cure type urethane resin.

7. The pattern-printed sheet according to claim 4, wherein the surface protective layer is a crosslink-hardened resin composition of a resin composition curable by an ionizing radiation beam.

8. The pattern-printed sheet according to claim 4, wherein the curable resin composition contains a filler in the range of 0.5 or more by mass to less than 12 parts by mass relative to 100 parts by mass of a curable resin.

9. The pattern-printed sheet according to claim 4, wherein 60° gloss value thereof is in the range of 10 or more to 75 or less.

10. The pattern-printed sheet according to claim 1, wherein the first region comprises reference points arranged in parallel in vertical and horizontal directions, the dot pattern formed in the first region comprises dots displaced from the reference points.

11. The pattern-printed sheet according to claim 1, wherein the first region and the second region are formed contiguously.

12. The pattern-printed sheet according to claim 1, wherein the first region and the second region are formed with a space therebetween.

13. The pattern-printed sheet according to claim 1, wherein, in the first region, reference points are set up in parallel in vertical and horizontal directions with the same distance, and the dots of the first dot pattern are displaced predetermined distances from side to side and up and down from these reference points, whereby locations of dots in the first dot pattern can be identified by a relative location relation from the reference points of the dots.

* * * * *